(12) United States Patent
Pantos et al.

(10) Patent No.: US 8,650,289 B2
(45) Date of Patent: Feb. 11, 2014

(54) ESTIMATING BANDWIDTH BASED ON SERVER IP ADDRESS

(75) Inventors: Roger Pantos, Cupertino, CA (US); William B. May, Jr., Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 13/153,373

(22) Filed: Jun. 3, 2011

(65) Prior Publication Data
US 2012/0311134 A1 Dec. 6, 2012

(51) Int. Cl.
*G06F 15/173* (2006.01)

(52) U.S. Cl.
USPC .......................................................... 709/224

(58) Field of Classification Search
USPC .................. 709/223–226, 233, 235, 249; 370/229–235, 237, 253, 395.1
See application file for complete search history.

(56) References Cited

U.S. PATENT DOCUMENTS

| | | | |
|---|---|---|---|
| 6,188,438 B1 * | 2/2001 | Ueda ............................. | 348/460 |
| 6,195,680 B1 * | 2/2001 | Goldszmidt et al. .......... | 709/203 |
| 6,438,141 B1 | 8/2002 | Hanko et al. | |
| 6,625,656 B2 | 9/2003 | Goldhor et al. | |
| 6,820,133 B1 | 11/2004 | Grove et al. | |
| 7,233,571 B1 | 6/2007 | Krishnamurthy et al. | |
| 2002/0165956 A1 * | 11/2002 | Phaal ............................ | 709/224 |
| 2006/0064689 A1 * | 3/2006 | Zhang .......................... | 718/100 |
| 2006/0218606 A1 * | 9/2006 | Jung et al. ...................... | 725/95 |
| 2007/0133603 A1 | 6/2007 | Weaver et al. | |
| 2008/0049787 A1 | 2/2008 | McNaughton et al. | |
| 2009/0080328 A1 | 3/2009 | Hu et al. | |

FOREIGN PATENT DOCUMENTS

| | | | |
|---|---|---|---|
| GB | 2466208 A | * | 6/2010 |
| WO | WO 2009082849 A1 | * | 7/2009 |
| WO | WO 2009118602 A2 | * | 10/2009 |

OTHER PUBLICATIONS

NN9301178. "Real Time Bandwidth Adaptation Algorithm." IBM Technical Disclosure Bulletin. Jan. 1993. vol. 36, Issue 1. 3 pages.*
Kwon, Jin B., et al., "A Statistical Admission Control Scheme for Continuous Media Servers Using Caching," Multimedia Tools and Applications, Month Unknown, 2003, Korea.
Saparilla, Despina, et al., "Streaming Stored Continuous Media over Fair-Share Bandwidth," Proceedings of the 12th International Workshop on Network, Month Unknown, 2000.

* cited by examiner

*Primary Examiner* — Jeffrey R Swearingen
(74) *Attorney, Agent, or Firm* — Meyertons, Hood, Kivlin, Kowert & Goetzel, P.C.

(57) ABSTRACT

Some embodiments provide a method for estimating bandwidth for receiving data at a device during a communication session from a set of servers based on identities of the servers. During the session, the method receives a first set of data packets reflecting a first server identity. The method detects a change of server identity during the session based on a second set of received data packets that reflect a second server identity that is different from the first server identity. The method uses the second server identity to calculate a bandwidth estimate that accounts for the change based on a history of interactions during the session with the second server.

19 Claims, 11 Drawing Sheets

ESTIMATING BANDWIDTH BASED ON SERVER IP ADDRESS

BACKGROUND

Accurately estimating bandwidth is often useful during a download session for downloading content through a network (e.g., Internet). For instance, in order to provide a high quality user experience, a device downloading and playing back content needs to accurately estimate bandwidth. The existing bandwidth estimation techniques use one or combinations of various metrics, such as packet inter-arrival time, round-trip-time ("RTT"), or packet loss rate per media stream. One common technique is based on sending a number of back-to-back packets ("packet sequence") on one side of the connection and deriving an estimate from the inter-arrival time of the received packets on the other side. However, the estimates derived by using this common technique may not be useful for downloading content for playback, due to large fluctuations in bandwidth over the course of the download session.

Also, during a download session, the connection to the content server transmitting the content may change to another content server that transmits the same content. The connection may change in the middle of the download session, between files or packets of the content, so that the device receives a portion of the content from one content server and another portion of the content from a different content server. For instance, a device downloading a movie from a server may receive different portions of the movie from different servers. The connections from the device to these servers may have vastly different bandwidths. Thus, when the device estimates the bandwidth based on an average of calculated bandwidths using one of the techniques described above, it may grossly over- or under-estimate the bandwidth because different portions of the content are received from different servers. This may degrade the quality of the user experience. For example, if the video and audio streams of the movie are provided at a bitrate higher than the available bandwidth of the connection, playback of the movie may eventually stop in order to wait for additional portions of the content to download. On the other hand, when higher bandwidth becomes available, if the content is not provided at different bitrates, the video and audio quality will not be as good as possible.

BRIEF SUMMARY

Some embodiments of the invention provide a novel method for estimating the bandwidth during a communication session for receiving content at a receiving device from several content transmitting devices. The method estimates the bandwidth based on the identities of the transmitting devices that send the receiving device content during the communication session.

At the start of the communication session, the method of some embodiments records the identity of the transmitting device that starts the transmission of content to the receiving device. The method also computes an initial estimate of the bandwidth. During the session, each time that the transmitter of the content changes from one transmitting device to another, the method notes the identity of the new transmitting device, and accounts for the change between the transmitting devices in estimating the bandwidth.

In different embodiments, the method identifies the transmitting device that transmits content to the receiving device differently. The method of some embodiments uses a network address of the transmitting device that accompanies the content received by the receiving device to identify the transmitting device. The network address in some embodiments is embedded in one or more packets that accompany the packets containing the content. In some embodiments, the network address is the IP (Internet Protocol) address of the transmitting device.

Different embodiments differently account for the change between the content transmitting devices in estimating the bandwidth. In some embodiments, the method changes from a first bandwidth computation process to a second bandwidth computation process each time it detects that the content transmitting device has changes from one device to another. In other embodiments, the method uses the same bandwidth computation process before and after the detected change in the content transmitting device, but modifies some of the parameters that this process uses in computing its bandwidth estimate.

For instance, in some embodiments, the method computes the estimated bandwidth at any time during a communication session based on a calculation that factors several bandwidth estimates that the method computed previously. When the method detects a change between the content transmitting devices, the method in some of these embodiments modifies the number of previously computed bandwidth estimates that it uses to calculate its current bandwidth estimate.

In some embodiments, the method resets the bandwidth calculation upon detecting the change between the transmitting devices. That is, any sample data that was accumulated for the previous transmitting device is discarded and new sample data is accumulated for the current transmitting device. Once enough new sample data is accumulated, the method then estimates the bandwidth for the current transmitting device. For example, a set of packets containing content data can be downloaded from the current transmitting device over a particular interval (e.g., x number of seconds). The set of packets is then used to estimate the bandwidth for the current transmitting device.

In different embodiments, the method differently computes the current bandwidth estimate based on the previously computed bandwidth estimates. For example, in some embodiments, the method identifies an instantaneous bandwidth estimate for each set of packets that it receives or at particular intervals of time during the communication session. For each set of packets or particular interval of time, the method then computes a blended bandwidth estimate based on the instantaneous bandwidth estimate (that was computed for the set of packets or particular interval of time) and previous blended and/or instantaneous bandwidth estimates that it computed for previous sets of packets or intervals of time. Examples of computations that can perform such blending include computations that compute weighted or unweighted averages, means, medians, modes, etc. When the content transmitter changes from one transmitting device to another, some of these embodiments reduce the number of previous bandwidth estimates that are accounted for to compute the blended bandwidth estimate at the time of the detection of the change.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method that estimates the bandwidth for receiving content at a receiving device based on the identities of the transmitting devices that send the receiving device content during the communication session. At the start of the communication session, the method of some embodiments records the identity of the transmitting device that starts the transmission of content to the receiving device. The method also computes an initial estimate of the bandwidth. During the session, each time that the transmitter of the content changes from one transmitting device to another, the method notes the identity of the new transmitting device, and accounts for the change between the transmitting devices in estimating the bandwidth.

Figure 1:
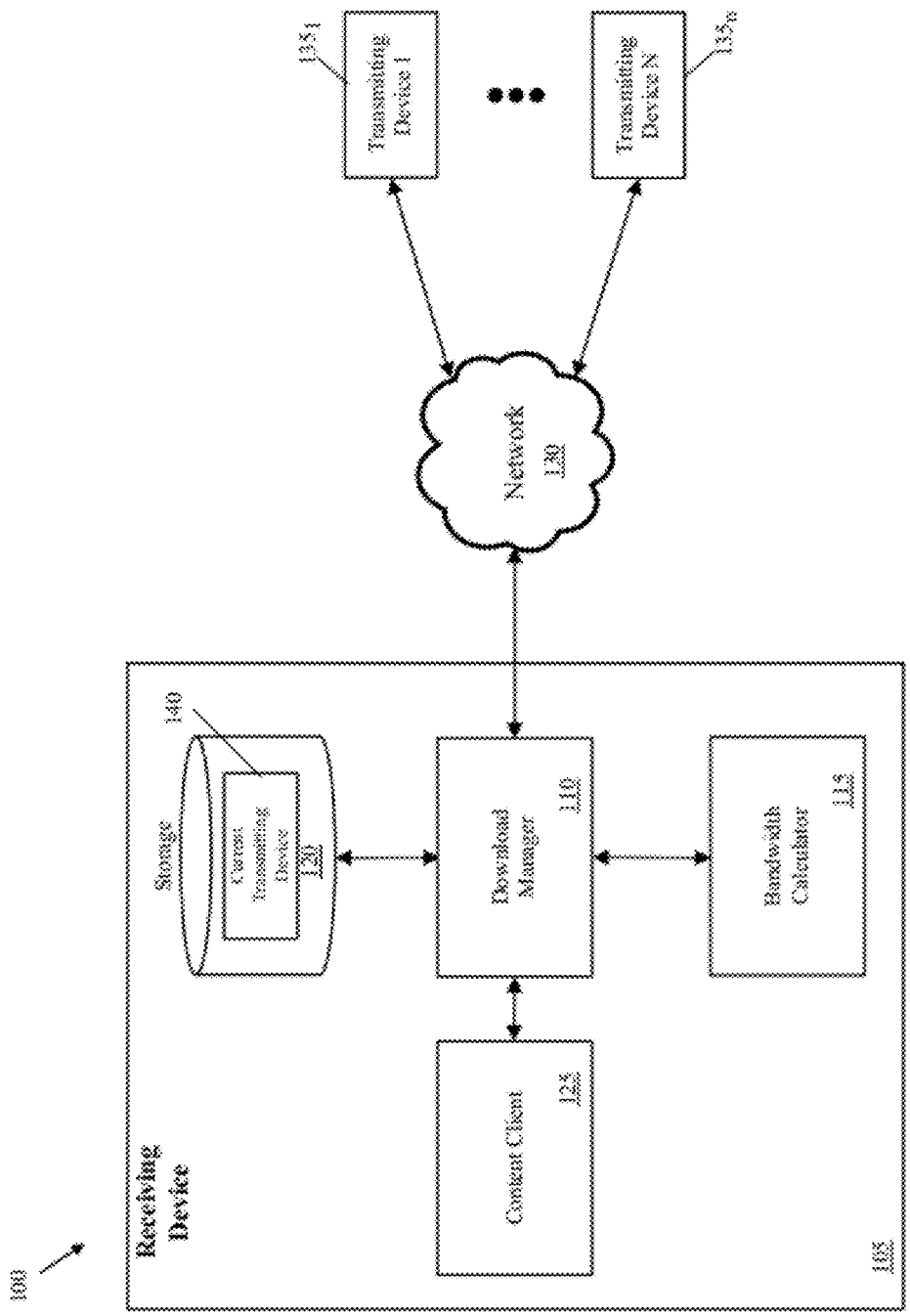
FIG. 1 illustrates a device that estimates the bandwidth based on the identities of the transmitting devices that send content during a communication session.

FIG. 1 illustrates a device 105 that uses the method of some embodiments to estimate the bandwidth for receiving content from a set of transmitting devices 135 based on the identities of the transmitting devices that send the receiving device 105 content during a communication session. The transmitting or receiving devices can be different types of devices in different embodiments. In some embodiments, the transmitting or receiving device can be any electronic device that is capable of transmitting or receiving content. Examples of such devices include computers (e.g., desktops, laptops, servers, etc.), handheld devices, phones, smart phones, tablets, settop boxes, televisions, monitors, etc.

As shown in this figure, the device 105 includes a download manager 110, a bandwidth calculator 115, a storage 120, and a content client 125. The content client 125 is an application that executes on the receiving device 105 and processes (e.g., plays, displays, executes, etc.) content that the device receives from the transmitting devices 135. In some embodiments, the content client might not reside on the same device as the download manager and the bandwidth calculator. Content as used in this document generally refers any type of data that is transmitted between two devices. Examples of such content include media content, such as picture data, audio data, video data, text data, and/or other media data, such executable program data.

The download manager 110 is a module that is responsible for downloading content from the transmitting devices 135 during a communication session. In some embodiments, the download manager starts to download content at the request of the content client. The download manager manages the download of content from the transmitting devices differently in different embodiments. In some embodiments, the download manager 110 downloads one piece of content as several content segments that it downloads from one or more transmitting devices 135 through a network 130. In some embodiments, each content segment represents one or more packets that contain a portion of the piece of content. In some embodiments, the network is a local area network, a wide area network, a public network of networks (e.g., Internet), a private network (e.g., a cellular or private switch telephone network), etc.

During a communication session, the download manager 110 of some embodiments may receive different content segments from different transmitting devices 135. The reason for switching between the different transmitting devices is different in different embodiments. For instance, in some embodiments, the different transmitting devices are different content caching servers. During a communication session, some of these embodiments have different content caching servers supply different content segments because of network congestion issues, or because of the load level of different caching servers, or because of some other reasons.

At the start of a communication session in which the receiving device 105 is downloading one piece of content, the download manager 110 records the identity of the transmitting device that starts the transmission of content to the receiving device in the storage 120. In different embodiments, the download manager identifies the transmitting device that transmits content to the receiving device differently. The download manager of some embodiments uses a network address of the transmitting device that accompanies each content segment received by the receiving device to identify the transmitting device. The network address in some embodiments is embedded in one or more packets that accompany the packets containing the content. In some embodiments, the network address is the IP (Internet Protocol) address of the transmitting device.

At the start of the communication session, and at particular periods during the communication session, the download manager 110 uses the bandwidth calculator to compute an initial estimate of the bandwidth at the start of the communication session and to update this estimate at subsequent periods in the communication session. The bandwidth calculator of different embodiments performs its bandwidth calculations differently in different embodiments. Several examples of such calculations are further described below.

Each time that the transmitter of the content changes from one transmitting device to another during the communication session in which the receiving device receives the piece of content, the download manager notes the identity of the new transmitting device in the storage 120, and accounts for the change between the transmitting devices in estimating the bandwidth. The download manager of different embodiments differently accounts for the change between the content transmitting devices in estimating the bandwidth. In some embodiments, each time the download manager 110 directs the bandwidth calculator to update its bandwidth estimate, it provides the calculator with data that allows it to determine whether there has been a change in the transmitting devices.

In response to this data, the bandwidth calculator 115 changes from a first bandwidth computation process to a second bandwidth computation process each time it detects that the content transmitting device has changed from one device to another. In other embodiments, the calculator 115 uses the same bandwidth computation process before and after the detected change in the transmitting devices, but modifies some of the parameters that this process uses in computing its bandwidth estimate. For instance, in some embodiments, the calculator computes the estimated bandwidth at any time during a communication session based on a calculation that factors several bandwidth estimates that the calculator computed previously. When the calculator 115 detects a change between the content transmitting devices, the calculator in some of these embodiments modifies the number of previously computed bandwidth estimates that it uses to calculate its current bandwidth estimate.

In different embodiments, the calculator differently computes the current bandwidth estimate based on the previously computed bandwidth estimates. For example, in some embodiments, the calculator identifies an instantaneous bandwidth estimate for each set of packets that it receives or at particular intervals of time during the communication session. For each set of packets or particular interval of time, the calculator then computes a blended bandwidth estimate based on the instantaneous bandwidth estimate (that was computed for the set of packets or particular interval of time) and previous blended and/or instantaneous bandwidth estimates that it computed for previous sets of packets or intervals of time. Examples of computations that can perform such blending include computations that compute weighted or unweighted averages, means, medians, modes, etc. When the content transmitter changes from one transmitting device to another, some of these embodiments reduce the number of previous bandwidth estimates that are accounted for to compute the blended bandwidth estimate at the time of the detection of the change.

Figure 2:
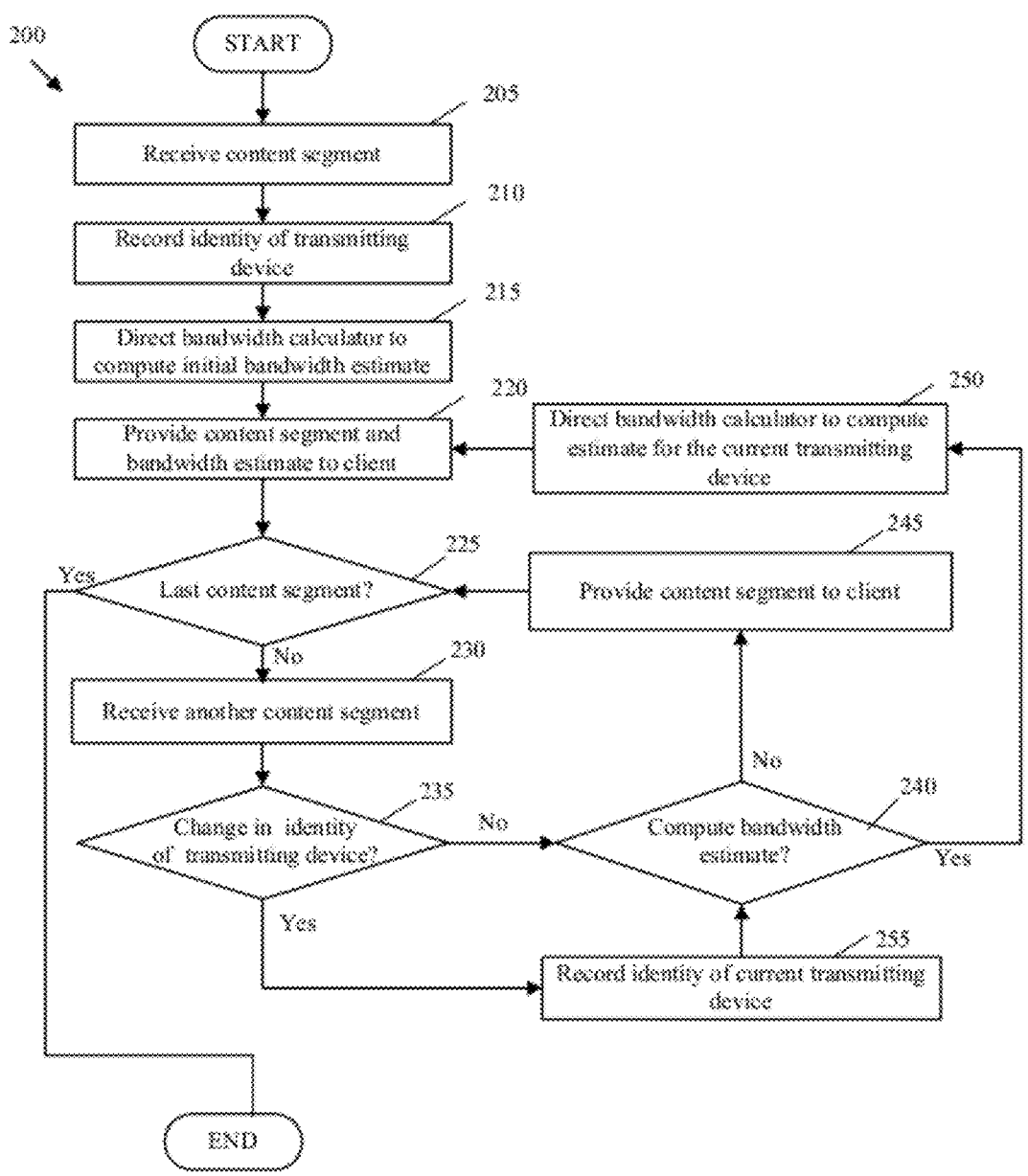
FIG. 2 conceptually illustrates a process that some embodiments perform to estimate the bandwidth for receiving content from a set of transmitting devices.

The operations of the receiving device 105 will now be described by reference to FIG. 2. FIG. 2 conceptually illustrates a process 200 that some embodiments performs to estimate the bandwidth for receiving content from a set of transmitting devices. Specifically, the process 200 illustrates how the receiving device 105 estimates bandwidth by taking into account the change between the transmitting devices.

The process 200 beings by receiving (at 205) a content segment during a communication session. As shown in FIG. 2, the device 105 receives the content segment from one of the transmitting devices 135 through the network 130. In some embodiments, the download manager 110 starts to download the content by sending an initial content request. This initial content request may be based on a content request that is received at the content client 125 from its user.

After receiving the content segment, the process 200 records (at 210) an identity of the transmitting device. In some embodiments, the download manager 110 records a network address of the transmitting device 135 that accompanies the content segment. Specifically, at the start of a communication session in which the receiving device 105 is downloading one piece of content, the download manager 125 records the identity of the transmitting device that starts the transmission of content to the receiving device in the storage 120. The network address is embedded in one or more packets that accompany the packets containing the content segment. In some embodiments, the network address is the IP address of the transmitting device.

The process 200 then computes (at 215) an initial bandwidth estimate. As mentioned, the download manager uses the bandwidth calculator to compute an initial estimate of the bandwidth at the start of the communication session and to update this estimate at subsequent periods in the communication session. The bandwidth calculator of different embodiments performs its bandwidth calculations differently in different embodiments. Several examples of such calculations are further described below.

The process 200 then provides (at 220) the initial bandwidth estimate and the content segment to the content client. In some embodiments, the download manager 110 receives the initial bandwidth estimate from the bandwidth calculator 115 and provides this estimate to the content client 125. In the example illustrated in FIG. 1, the content client 125 receives the content segment from the download manager 110.

The process 200 then determines (at 225) whether the received content segment is the last content segment. If the received content segment is not the last content segment, the process 200 receives (at 230) another content segment. As different transmitting devices can supply different content segments, the received content segment may not be from the transmitting device that sent the previous content segment. In some embodiments, the last content segment represents the only remaining content segment sent from the transmitting device during the communication session. For example, the last content segment may be a set of packets that fulfils one or more content requests from the receiving device.

The process 200 then determines (at 235) whether there is a change in the identity of the transmitting device. In some embodiments, the download manager 110 performs this operation by identifying the recorded identity and comparing it with an identity derived from the other content segment that was received at 230. In other embodiments, the download manager 110 provides data that allows the bandwidth calculator 115 to determine whether the transmitting device has changed from one device to another.

The process 200 determines (at 240) whether to update the bandwidth estimate. Referring to FIG. 1, the download manager 110, in some embodiments, makes this determination based on whether a particular interval of time has passed. For example, the bandwidth estimate can be updated at a granular level over a particular interval of time (e.g., x number of seconds). If the time interval has not passed, the download manager can accumulate one or more additional content segments to perform the estimation. In some embodiments, the process 200 determines (at 240) whether to update the bandwidth estimate based the amount of content data received at the receiving device. For example, the bandwidth estimate can be updated when a particular amount of content segments has been accumulated at the receiving device.

When the determination is made (at 235) that the identity of the transmitting device is not the same, the process 200 records (at 255) the identity of the current transmitting device. As will be described in detail below, the process 200, in some embodiments, resets bandwidth calculation upon detecting the change in the transmitter of content. After recording the identity of the current transmitting device, the process then proceeds to 240.

When the determination is made that a new estimate is not needed, the process 200 provides (at 245) the other content segment to the content client. Otherwise, the process 200 proceeds to 250. The process 200 computes (at 250) a new bandwidth estimate. In some embodiments, the bandwidth calculator 115 computes a new estimated bandwidth by taking into account the change in the transmitting devices. As mentioned, different embodiments differently account for the change between the content transmitting devices in estimating the bandwidth. In some embodiments, the bandwidth calculator 115 changes from a first bandwidth computation process to a second bandwidth computation process each time it detects that the content transmitting device has changed from one device to another. In other embodiments, the bandwidth calculator 115 uses the same bandwidth computation process before and after the detected change in the content transmitting device, but modifies some of the parameters that this process uses in computing its bandwidth estimate.

After computing the new estimate, the process 200 returns to 220. As mentioned, the process 200 provides (at 220) the content segment and the new estimate to the content client. The process 200 then determines (at 225) whether the received content segment is the last content segment. If the received content segment is not the last content segment, the process 200 returns to 230. Otherwise, the process 200 ends.

Several more detailed embodiments of the invention are described below. Section I describes one example use of the bandwidth estimation techniques described above. Section II then describes an example architecture of a system that estimates bandwidth based on the change between transmitting devices during a communication session. Next, Section III describes several alternate embodiments. Section IV then describes the manner in which some embodiments coalesce sample data blocks into data buckets of fixed time lengths to smooth out bandwidth fluctuations caused by lower level buffering mechanisms. Lastly, Section V describes an electronic system with which some embodiments of the invention are implemented.

I. Example use of Bandwidth Estimate

The bandwidth estimation techniques described above estimate the bandwidth by accounting for the change between transmitting devices during a communication session. In some embodiments, the content client 125 is an adaptive media player that uses the bandwidth estimation to switch from streaming a lower quality version of a piece of content having a lower data rate (e.g., bit rate) and requiring less bandwidth to streaming a higher quality version having a higher data rate and requiring more bandwidth, or vice versa.

Figure 3:
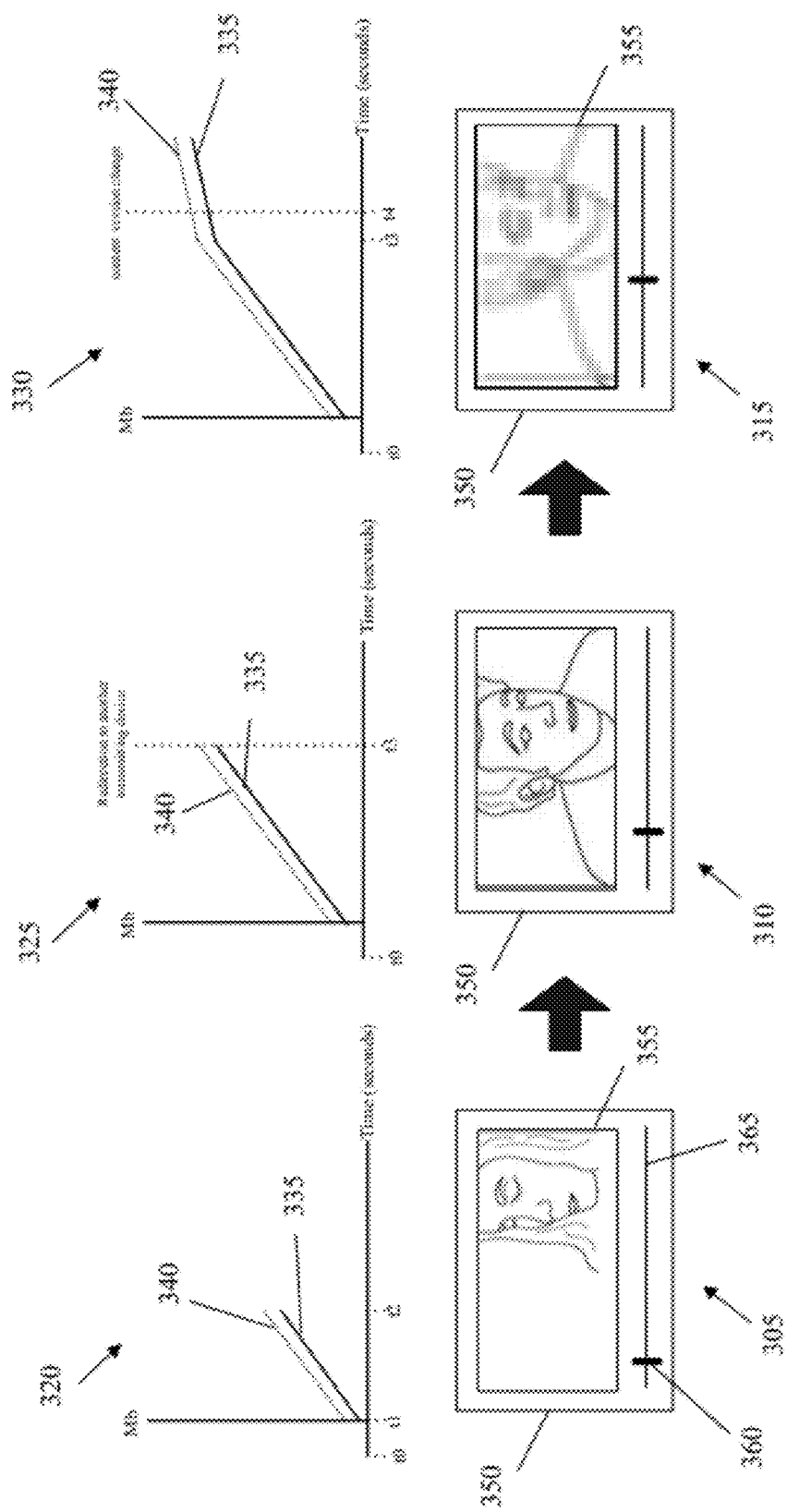
FIG. 3 conceptually illustrates an example of switching from streaming a higher quality version of a piece of content to a lower quality version based on the bandwidth estimate.

FIG. 3 conceptually illustrates an example of switching from streaming a higher quality version of a piece of content to a lower quality version based on the bandwidth estimate. Specifically, this figure illustrates an adaptive media player 350 at three different stages 305, 310, and 315. Each of these stages represents a particular point in time during the streaming and playback of the piece of content. The figure also includes three line graphs 320, 325, and 330 that correspond to the three different stages. Each of these three stages will be described in detail below after an introduction of the line graphs 320, 325, and 330.

As shown in FIG. 3, each of the line graphs 320, 325, and 330 includes an x-axis that represents time and a y-axis that represents megabytes. Each graph depicts a solid line 335 and a dotted line 340. The solid line 335 represents the amount of content data that has been downloaded over a period of time. The slope of the solid line 335 represents the download rate. The dotted line 340 represents the amount of content data that can be downloaded based on the bandwidth estimate. Accordingly, the slope of the dotted line 340 represents the bandwidth estimate.

Stage 305 illustrates the adaptive media player 350 playing the piece of streaming content. Specifically, it illustrates the adaptive media player 350 playing a first version of the piece of content based on the bandwidth estimate. The video playback screen 355 displays a video frame of the version of content that is currently being streamed. A playhead 360 moves along a timeline 365 to indicate the current position of the playback.

The position of the playhead 360 along the timeline 365 corresponds to t2 of the graph 320. As shown by the graph 320, the solid line 335 rises steadily along with the dotted line 340. In particular, the slopes of these lines indicate that the bandwidth estimate and the download rate are stable through t1 through t2.

At stage 310, the adaptive media player 350 plays the same version of the piece of content. However, the corresponding graph 325 indicates that there is a redirection to another transmitting device at t3. In some cases, the redirection is causes by the receiving device sending multiple requests (e.g., HTTP requests) for different successive content segments during the streaming session. This is because the receiving device is subject to redirection each time that a redirection server receives a content request from the receiving device. Several examples reasons for such redirection will be described in detail below by reference to FIG. 4.

At stage 315, the adaptive media player 350 switches from playing one version of the piece of content to another version. Specifically, the adaptive media player switches from a higher quality version to a lower quality version. This change in the playback version is illustrated with the adaptive media player displaying a lower quality frame of the piece of content on the video playback screen 355. The cause of the switch is illustrated by the graph 330.

As shown by the graph 330, the slope of the solid line 335 indicates that the bandwidth estimate after t3 has been reduced because of the change in transmitter of content. For example, the new transmitter of content may be streaming the piece of content at a lower rate than the previous transmitter. To account for the reduction, the adaptive media player 350 starts streaming a lower quality version at t4. This switch to the lower quality version ensures that playback of the piece of content remains uninterrupted.

To provide an optimal viewing experience, the adaptive media player 350, in some embodiments, is periodically or constantly monitoring the bandwidth estimate to switch to a higher quality version. In some such embodiments, the media player uses the bandwidth estimates to determine whether the switch will cause interruption during the playback of streaming content or cause it to perform another switch (e.g., switch to a lower quality version) later on during the playback.

II. System Architecture

Figure 4:
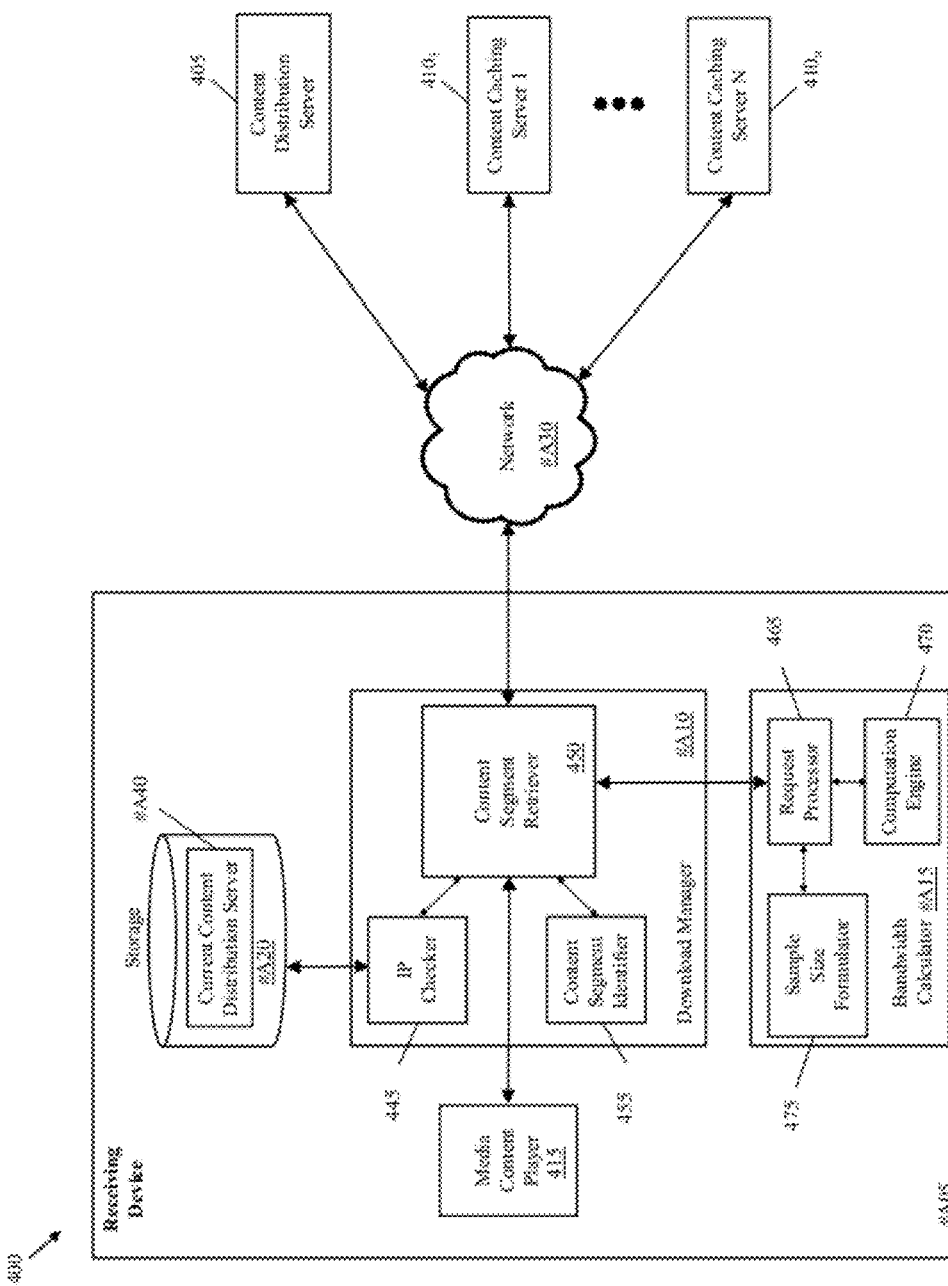
FIG. 4 conceptually illustrates an example system architecture of a receiving device that estimates bandwidth by accounting for the change between content caching servers during a communication session.

In the example described in FIG. 1, the system estimates bandwidth by accounting for the change between content transmitting devices during a communication session. FIG. 4 conceptually illustrates one example architecture of such a system. Specifically, this figure illustrates several components of the download manager 110 and the bandwidth calculator 115 that facilitate the bandwidth estimation. As shown, the device 105 includes (1) a download manager 110, (2) a bandwidth calculator 115, (3) a storage 120, and (4) a media content player 415. The figure also includes a content distribution server 405 and a set of content caching servers 410.

A. Content Distribution Network

The content distribution server 405 and the set of content caching servers 410 are part of a content distribution network (CDN) that delivers different pieces of content to different receiving devices. For illustrative purposes, FIG. 4 shows only the content distribution server 405 and the set of content caching servers 410. However, the CDN may include many other components and servers.

The content distribution server 405 receives a request for content from the receiving device 105 and redirects the request to any one of the different content caching servers 410. The content distribution server 405 can use a number of different algorithms to perform this redirection. For example, the content distribution server can redirect the request to a particular caching server because of network congestion issues, because of the load level of different caching servers, because of location reasons, or because of some other reasons.

When redirected by the content distribution server 405, the content caching server sends one or more content segments to the receiving device. To improve delivery of content, each content caching server may be strategically located at different physical locations. For example, one content caching server may be located in Los Angeles, while another content caching server may be located in Chicago.

In some cases, the CDN provides content to adaptive media players. In an adaptive environment, each content caching server stores or caches multiple versions of the same piece of content having different quality. Based on the bandwidth of the receiving device, a content caching server may switch from streaming a lower quality version of a piece of content having a lower data rate and requiring less bandwidth to streaming a higher quality version having a higher data rate and requiring more bandwidth, or vice versa. As will be described below, in some embodiments, the media content player 415 facilitates the switch by using the bandwidth estimates from the download manger 110.

In some cases, the content caching server receives different segments of a piece of content from an originating server (not shown) and caches the segments for transmission to the receiving derive. That is, the content caching server may not store all of the segments of a piece of content when it starts to send a content segment to the receiving device. In some cases, the content distribution server 405 redirects the request from the receiving device to a particular caching server based on whether a particular content caching server has at least a portion of the piece of content in its cache.

B. Receiving Device

As mentioned above, the receiving device 105 can be different types of devices in different embodiments. In some embodiments, the receiving device 105 can be any electronic device that is capable of receiving content. Examples of such devices include computers (e.g., desktops, laptops, servers, etc.), digital media receivers, TV streaming devices, handheld devices, phones, smart phones, tablets, settop boxes, televisions, monitors, etc.

1. Media Player

In some embodiments, the media player 415 is a content client application that executes on the receiving device 105. In the example illustrated in FIG. 4, the media player 415 plays the content from one or more the content caching servers 410. For example, the media player 415 may receive a user's input to play a piece of content. The media player then receives different content segments from one or more the content caching servers 410, and stores or buffers these segments before starting playback.

To provide uninterrupted playback of streaming content, the media player 415 of some embodiments determines when to start playback based on bandwidth estimates from the download manager 110. For example, in a progressive playback or download scenario, the media player 415 can make this determination by using the bandwidth estimates, the amount of content data in the buffer, and the amount of content data left to download. Alternatively, in an adaptive playback environment, the media player 415, in some embodiments, can determine when to start playback based on the bit rate (e.g., of one of several different versions of a piece of content to stream).

During playback, the transmitter of streaming content can change when a user moves a playhead of the media player. For example, when the user advances playback past a buffer point (e.g., the amount of downloaded data left to play back), a redirection to another content caching server can occur. Accordingly, in some such cases, the media player receives bandwidth estimates from the download manager that accounts for the change in the content transmitter caused by the movement of the playhead.

The media player 415, in some embodiments, uses the bandwidth estimates for adaptive reasons. As mentioned, in an adaptive environment, each content caching server stores or caches multiple versions of the same piece of content having different quality (e.g., data or bit rate). The media player uses the bandwidth estimates to determine whether to switch from streaming a lower quality version having a lower data rate and requiring less bandwidth to streaming a higher quality version having a higher data rate and requiring more bandwidth, or vice versa.

To provide an optimal viewing experience, the media player, in some embodiments, is periodically or constantly monitoring the bandwidth estimates to switch to a higher quality version. In some such embodiments, the media player uses the bandwidth estimates to determine whether the switch will cause interruption in the playback of streaming content or cause it to perform another switch (e.g., switch to a lower quality version) later on in the playback.

2. Download Manager

The download manager 110 is a module that is responsible for downloading content from the content caching servers 410 during a communication session. In some embodiments, the download manager 110 performs a number of different operations including (1) recording the identities of one or more content caching servers, (2) providing estimation data to the bandwidth calculator 115, and (3) providing bandwidth estimates and content data to the media content player 415. To perform these operations, the download manager 110, in some embodiments, includes a content segment retriever 450, a content segment identifier 455, and an IP checker 445.

In some embodiments, the content segment retriever 450 starts to download content at the request of the media content player 415. The content segment retriever 450 manages the download of content from the transmitting devices differently in different embodiments. In some embodiments, the content segment retriever 450 downloads one piece of content as several content segments that it downloads from one or more of the content caching servers 410 through the network 130.

During a communication session, the content segment retriever 450 of some embodiments may receive different content segments from different content caching servers 410. As mentioned, the reason for switching between the different content caching servers is different in different embodiments. For instance, different content caching servers may supply different content segments because of network congestion issues, or because of the load level of different caching servers, or because of some other reasons.

The content segment identifier 455 identifies the different content segments from the content caching server. In different embodiments, the content segment identifier 455 identifies the content caching server that transmits content to the receiving device differently. The content segment identifier 455 of some embodiments uses a network address of the content caching server that accompanies each content segment received by the receiving device to identify the content caching server. The network address in some embodiments is embedded in one or more packets that accompany the packets containing the content. In some embodiments, the network address is the IP (Internet Protocol) address of the content caching server.

At the start of a communication session in which the receiving device 105 is downloading one piece of content, the IP checker 445 records the identity of the content segment based on the identification of the content segment identifier 455. That is, the IP checker 445 stores the identity of the caching server that starts the transmission of content to the receiving device in the storage 120.

3. Bandwidth Calculator

The bandwidth calculator 115 is a module that is responsible for computing bandwidth estimates. For example, at the start of a communication session, and at particular periods during the communication session, the download manager 110 uses the bandwidth calculator 115 to compute an initial estimate of the bandwidth at the start of the communication session and to update this estimate at subsequent periods in the communication session. To estimate the bandwidth, the bandwidth calculator 115, in some embodiments, includes a request processor 465, a sample size formulator 475, and a computation engine 470.

In some embodiments, each time the download manager 110 directs the bandwidth calculator 115 to update its bandwidth estimate, it provides the request processor 465 with data that allows the request processor to determine whether there has been a change in the content caching server. The request processor 465 can receive one or more different identifying information, such as a network address, server name, flag that indicates the server has changed, etc.

Upon the detection of the change in the transmitter of content, the sample size formulator 475, in some embodiments, specifies a bandwidth computation process that the computation engine 470 uses to estimate the bandwidth. This may entail specifying a different algorithm, a different set of parameter, etc. In some embodiments, at the start of the communication session, the sample size formulator 475 specifies (e.g., by default) a first bandwidth computation process to estimate the bandwidth.

In some embodiments, the first bandwidth computation process specifies a range of sample data for which to estimate the bandwidth. Examples of such ranges include temporal range (also called a temporal window), sample size range, etc.

As time passes, any new data that is received (e.g., from the content caching server) contributes to only a portion or a certain percentage of the actual data that is used to estimate the bandwidth. This prevents the bandwidth estimate from rapidly fluctuating either up or down because the new sample data is not the only determining factor in estimating the bandwidth.

During the communication session, the computation engine 470 may use the same first bandwidth computation process. However, in some embodiments, when there is a change in the transmitter of the content, the sample size formulator 475 may specify a second bandwidth computation process that uses a different set of parameters. Alternatively, or conjunctively, the second bandwidth computation process, in some embodiments, specifies a different formula or algorithm for computing the estimated bandwidth.

Figure 5:
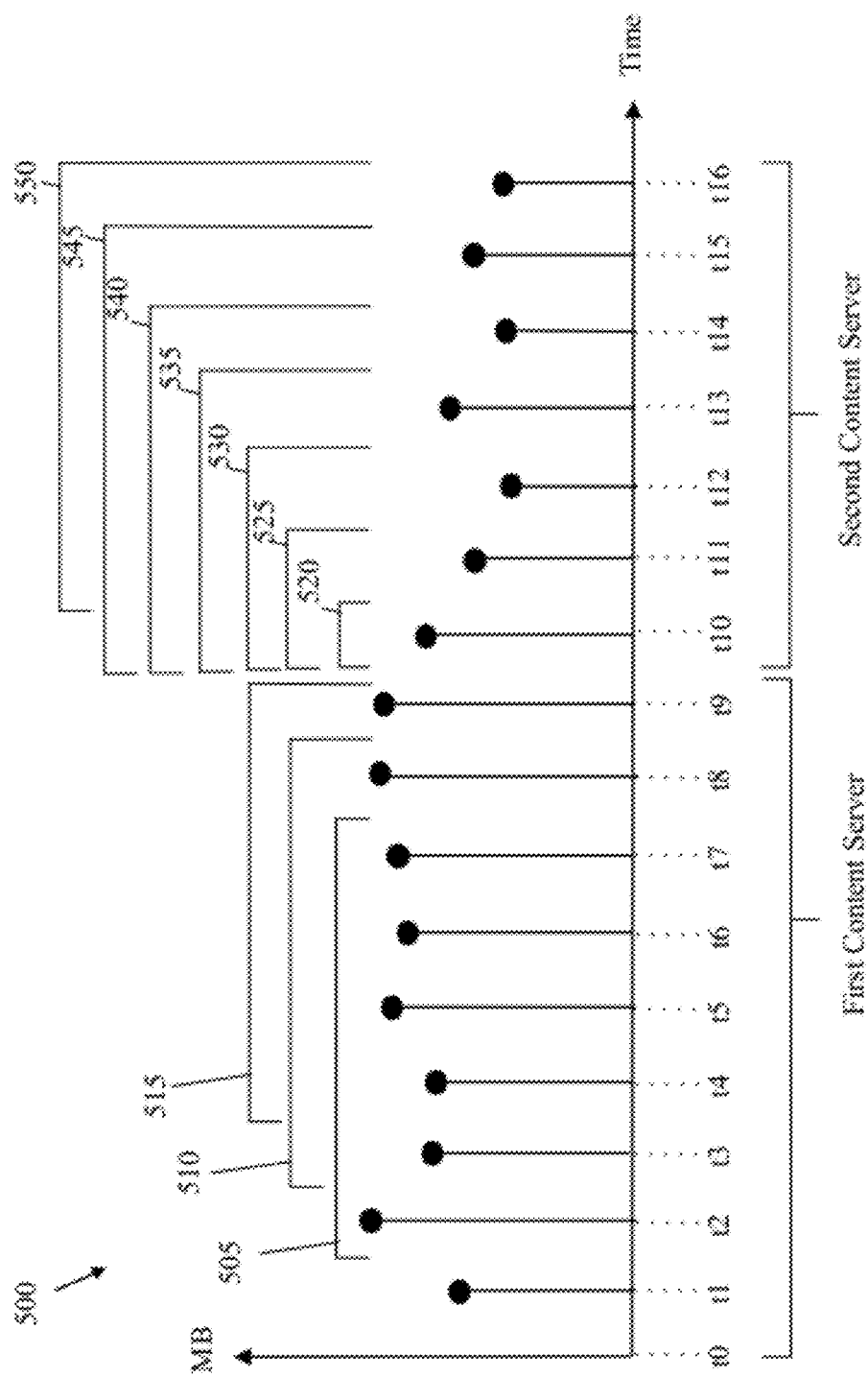
FIG. 5 illustrates an example of modifying a range of sample data when a change in the transmitter of content is detect during the communication session.

In some embodiments, the bandwidth calculator 115 resets the bandwidth calculation upon detecting the change between the content caching servers. FIG. 5 illustrates one such example of resetting the bandwidth calculation. As shown, the graph 500 includes an x-axis that represent time and a y-axis that represent the amount of sample data received over a particular interval. Specifically, the y-axis plots the amount of sample data in megabits (Mb), while the x-axis plots time at several time intervals (t0 to t16). The origin at which these two axes meet represents 0 Mb and 0 time, respectively. At each time interval t1 to t16, a bar extends vertically from 0 Mb to a particular Mbs. This vertical bar represents the amount of sample data received during the corresponding interval (e.g., the period prior to the plotted time). As shown by the braces underneath the graph 500, time intervals t0 to t9 represent intervals of time when sample data is received from a first content caching server, and time intervals t10 to 16 represent intervals of time when sample data is received from a second content caching server.

To better illustrate the range modification, the graph 500 depicts several temporal windows. Specifically, the graph 500 depicts multiple braces 505-550 to represent the several temporal windows. For example, the brace 505 represents a temporal window from time t2 to t7. In some embodiments, each temporal window includes several sample data for which a particular bandwidth is estimated. Specifically, in the example illustrated in FIG. 5, each of the temporal windows 505, 510, and 515 includes a particular set of sample data that is used to estimate the bandwidth. For example, at t7, the bandwidth is estimated based on the set of sample data received from the first content caching server from t2 to t7. At t8, the bandwidth is estimated based on the set of sample data from t3 to t8. Accordingly, the graph 500 depicts a moving window for estimating bandwidth at different time intervals.

As mentioned above, the bandwidth calculator resets the bandwidth calculation upon detecting the change between the content caching servers. That is, any sample data that was accumulated for the previous content caching server is discarded and new sample data is accumulated for the current content caching server. Once enough new sample data is accumulated, the bandwidth is estimated using the accumulated data. This is illustrated in FIG. 5 as the previous sets of sample data from the first content caching server is discarded in estimating the bandwidth for the second content server. For instance, at t10 to t15, new sets of sample data corresponding to temporal widows 520-545 are accumulated. At t15, the bandwidth is estimated for the second content server using the accumulated sample data. Similarly, at t16, the bandwidth is estimated using sample data from t11 to t16. In some embodiments, the bandwidth estimate for the second content caching server is calculated based on at least some of the data samples received from the first content caching server. An example of such estimation will be described below by reference to FIG. 7.

Returning to FIG. 4, the computation engine 470, in some embodiments, uses the same bandwidth computation process before and after the detected change in the content caching servers, but modifies some of the parameters that the computation engine 470 uses in computing the bandwidth estimate. For example, the same first bandwidth computation process can be used by eliminating all or at least some of the previous bandwidth measurements to calculate the updated bandwidth estimate.

The computation engine 470 of different embodiments performs its bandwidth calculations differently in different embodiments. In some embodiments, the computation engine 470 computes instantaneous bandwidth measurements of sample data blocks of a piece of content, and derives the initial bandwidth estimates from the instantaneous bandwidth measurements. Different embodiments differently compute the initial bandwidth estimate from the instantaneous bandwidth measurements. In some embodiments, the computation engine 470 computes instantaneous bandwidth measurements at a particular interval. Different embodiments define the interval differently. For instance, the computation engine 470 of some embodiments defines the interval as a period of time. In other embodiments, the computation engine 470 defines the interval as a set of packets. Several examples of computing instantaneous bandwidth measurements are described in detail below by reference to FIG. 9.

To compute the initial bandwidth estimate from the instantaneous bandwidth measurements, the computation engine 470, in some embodiments, computes the average or the arithmetic mean of all instantaneous bandwidth measurements and uses the average as the initial bandwidth estimate. Instead of, or in conjunction with, using an average, the computation engine 470 of some embodiments computes the initial bandwidth estimate by calculating the median of all instantaneous bandwidth measurements, or by computing some other averaging calculations.

In different embodiments, the computation engine 470 differently computes the current bandwidth estimate based on the previously computed bandwidth estimates. For example, in some embodiments, the computation engine 470 identifies an instantaneous bandwidth estimate for each set of packets that it receives or at particular intervals of time during the communication session. For each set of packets or particular interval of time, the computation engine 470 then computes a blended bandwidth estimate based on the instantaneous bandwidth estimate (that was computed for the set of packets or particular interval of time) and previous blended and/or instantaneous bandwidth estimates that it computed for previous sets of packets or intervals of time. Examples of computations that can perform such blending include computations that compute weighted or unweighted averages, means, medians, modes, etc. When the content transmitter changes from one transmitting device to another, some of these embodiments reduce the number of previous bandwidth estimates that are accounted for to compute the blended bandwidth estimate at the time of the detection of the change.

Some embodiments apply different weighting factors to the bandwidth estimations during the course of a download session. One example of weighting a bandwidth estimate is expressed by the following formula:

$$((X \times \text{NEW}) + (Y \times \text{OLD})) \div (X+Y)$$

In some embodiments, NEW represents an instantaneous bandwidth calculation for a currently received data sample block, OLD represents a previously computed estimated bandwidth, X represents a weighting factor for the currently received sample, and Y represents a weighting factor for the previous estimated bandwidth. The sum of the weighting factors X and Y, in some embodiments, functions as the denominator of the formula. Thus, specific range implementations are based on variations of the formula above. Changing the weighting factor for Y in this formula, for example, has the effect of decreasing the number of previous samples in the range when Y is reduced, and increasing the number of previous samples in the range when Y is increased. This also has the effect, in turn, of increasing the impact of the currently received sample when Y is reduced, and decreasing the impact of the currently received sample when Y is increased.

Thus, to reflect variations of this formula, the ranges in some embodiments can cover more or less sample data blocks than those described above and shown in FIG. 5. As an example, a range of ten can be used when no change in content server is detected, by setting X=1 and Y=9 (i.e., 1 currently received sample and 9 previous bandwidth estimates). In contrast, the weighting factors can be set to emphasize the currently received sample using a range of four when a change in content server is detected, by setting X=1 and Y=3 (i.e., 1 currently received sample and 3 previous bandwidth estimates). Many other weighting factors can be used in different embodiments. For example, setting X=1 and Y=2 in order to strongly emphasize the currently received sample. In comparison, setting X=1 and Y=39 in order to substantially dilute the impact of the currently received sample in a profusion of previous bandwidth estimates.

C. Estimating Bandwidth based on Selected Bandwidth Estimation Process

Figure 6:
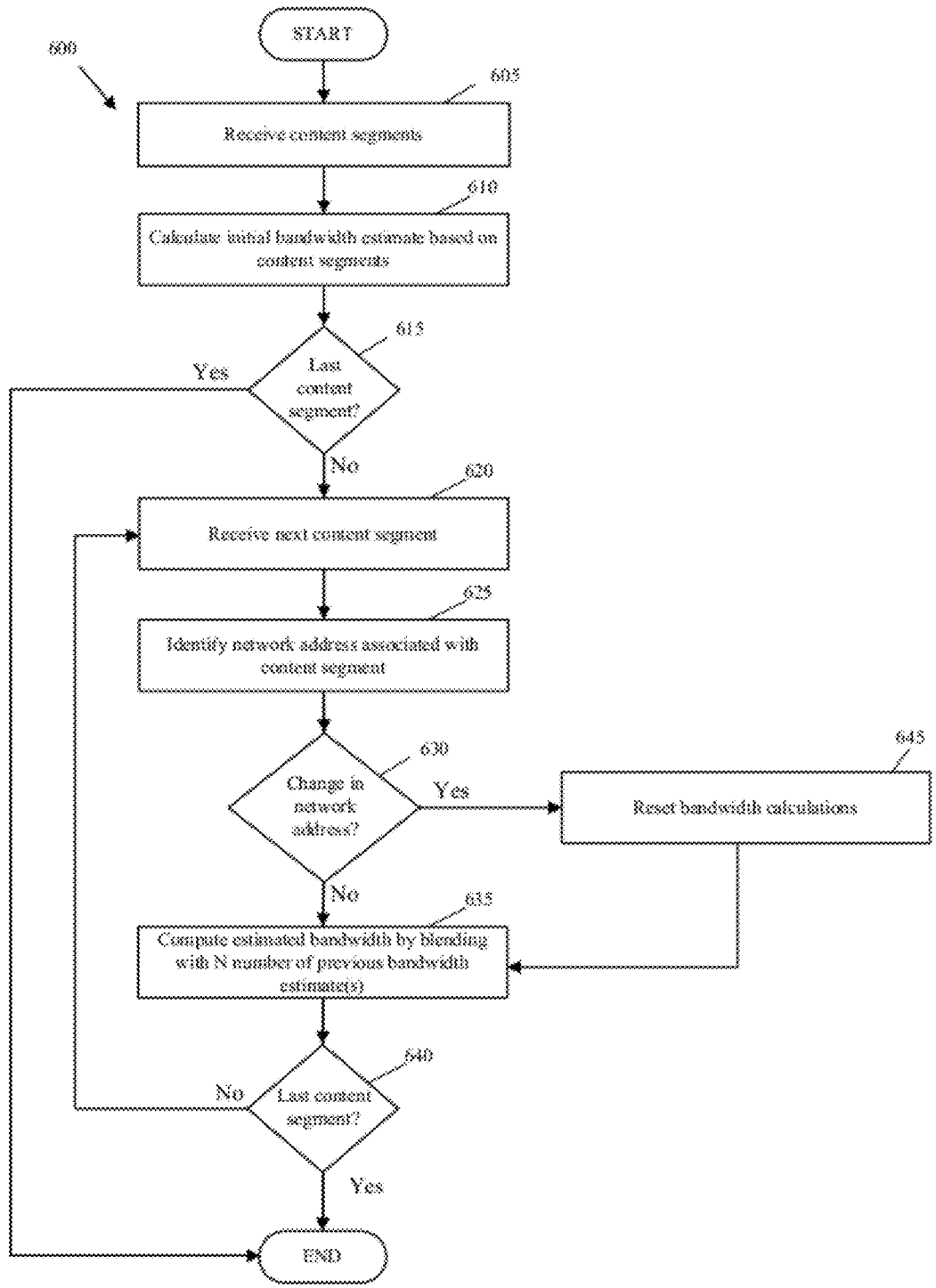
FIG. 6 conceptually illustrates a process that some embodiments perform to estimate the bandwidth.

Having described the components of FIG. 4, the operations of the receiving device 105 will now be described by reference to FIG. 6. FIG. 6 conceptually illustrates a process 600 that some embodiments performs to estimate the bandwidth by taking into account the change in the transmitter of content during a communication session. In some embodiments, the process 600 is performed with the bandwidth calculator 115 that resets bandwidth calculations in response to the change in the transmitter.

As shown, the process 600 begins by receiving (at 605) content segments. As described above, a content segment is defined in some embodiments as a certain number of packets or a set of packets received during a period of time. The process 600 then calculates (at 610) an initial bandwidth estimate based on the received contents segments. Different embodiments calculate the initial bandwidth estimate differently. For instance, the process 600 in some embodiments computes the initial bandwidth estimate by dividing the total amount of data in the received segments by the time taken to receive the segments. In other embodiments, the process 600 computes a bandwidth estimate for each received segment and then averages the bandwidth estimates to compute the initial bandwidth estimate.

The process 600 then determines (at 615) whether the process has received the last content segment. When the determination is made that the last content segment has been received, the process 600 ends. Otherwise, the process 600 proceeds to 620. In some embodiments, the last segment represents the only remaining segment sent from one of the content caching server during the communication session. For example, the last segment may be a last sample set of packets received by the content segment retriever 450, which fulfills one or more requests for content from the receiving device.

At 620, the process 600 then receives the next content segment. The process receives this segment from the same or different content caching server from which the process has received the last content segment. The process 600 then identifies (at 625) the network address associated with the content segment. The network address in some embodiments is embedded in one or more packets that accompany the packets containing the content. In some embodiments, the network address is the IP address of the transmitting device (e.g., a content caching server).

The process 600 then determines (at 630) whether the transmitting device sending the content has changed from one device to another. In some embodiments, the process 600 makes this determination by identifying the network address associated with the other content segments and comparing it with a previously stored network address.

When the content request has not been redirected to another transmitting device, the process 600 computes (at 635) the estimated bandwidth by performing a blending operation using N number of previous bandwidth estimate(s). Different embodiments compute the blended bandwidth estimate differently. For instance, the process 600 in some embodiments computes a blended bandwidth estimate based on the previous estimate and the received content segment. When the content request has been redirected to another transmitting device, the process 600 resets (at 645) bandwidth calculations. For example, the process in some embodiments discards any bandwidth estimation data accumulated for the previous transmitting device and accumulates new bandwidth estimation data for the current transmitting device.

The process then proceeds to 635 to compute an estimated bandwidth based on the content segment that the process has received from the transmitting device to which the content request has been redirected. In this case, the process computes the new bandwidth estimate by blending zero previous bandwidth estimates because the process has discarded (at 645) previous bandwidth estimates computed for the previous transmitting device. As such, the number N of previous bandwidth estimate(s) that the process can blend to compute an estimated bandwidth upon receiving a new content segment varies depending on the availability of the previous bandwidth estimates.

In some embodiments, the process does not compute an estimated bandwidth at 635 but new sample data is accumulated for the current transmitting device. Once enough new sample data is accumulated, the process then estimates the bandwidth for the current transmitting device. For example, a set of packets containing content data can be downloaded from the current transmitting device over a particular interval (e.g., x number of seconds). The set of packets is then used to estimate the bandwidth for the current transmitting device.

As shown in FIG. 6, the process 600 then determines (at 640) whether the received content segment is the last content segment. When the determination is made that the received content segment is not the last content segment, the process loops back to 620 to receive another content segment. Otherwise, the process 600 ends.

III. Alternative Embodiments

A. Sample Size Adjustment Variations

Several examples were described above in which the bandwidth estimation method resets the bandwidth calculation each time the receiving device detects a change in the transmitter of content from one transmitting device to another. Alternatively, some embodiments do not discard all historical bandwidth estimation data but use at least some of the data to estimate the current bandwidth.

Figure 7:
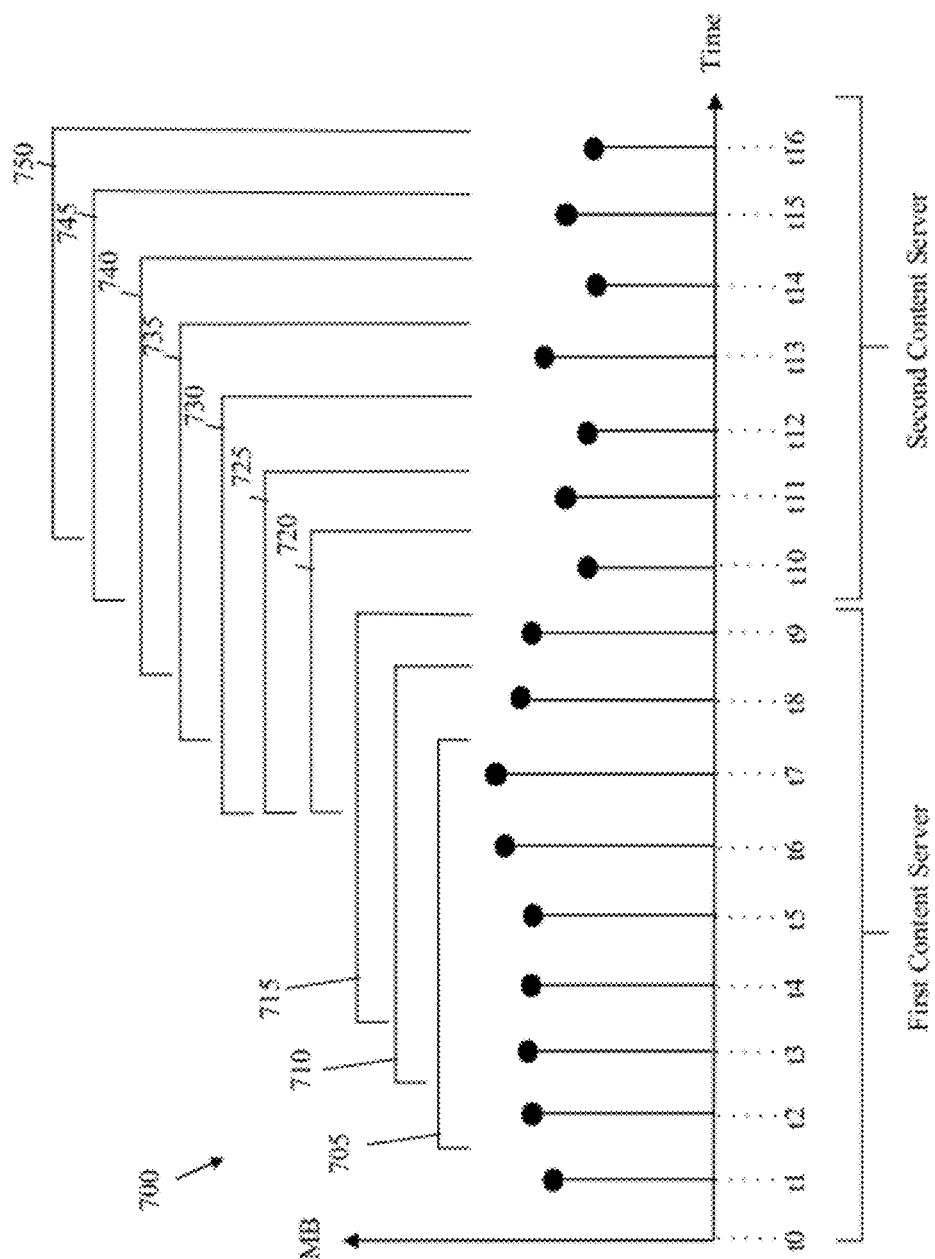
FIG. 7 illustrates an example of estimating the bandwidth by using at some of the bandwidth estimation data accumulated for the previous transmitting device prior to the change.

FIG. 7 illustrates an example of estimating the bandwidth by using at some of the bandwidth estimation data accumulated for the first content caching server prior to the change to the second content caching server. Specifically, this figure illustrates a graph 700 that depicts several temporal window 705-750. As shown, each of the temporal windows 705, 710, and 715 includes a particular set of sample data that is used to estimate the bandwidth. Specifically these sets of sample data are from the first content caching server.

After the server change, the bandwidth estimation process uses (at t10) a different sample size range that discounts at least some of the previous bandwidth estimation data. Specifically, the temporal window 720 indicates that it uses at least some of the samples received between t7 to t9 in order to estimate the bandwidth for the second content caching server.

As shown, the bandwidth estimation process uses a sample range that gradually increases over subsequent intervals. For example, the temporal window 725 indicates that it uses (at t11) the sample data received between t7 to t11 in order to estimate the bandwidth. The bandwidth estimation process continues to increase until it uses the same sample range as previously used for the first content caching server. Also, the bandwidth estimation process continues to use at least some of the previous sample data from the first content caching server until t15 when only sample data from the second content caching server is used to estimate the bandwidth.

B. Adjusting any Number of Different Parameters

Several detailed embodiments were described above in which the bandwidth estimation method adjusted the number of samples that are blended, averaged, or combined to produce a periodic revised bandwidth estimate. One of ordinary skill in the art would, however, realize that other embodiments adjust their bandwidth estimations differently upon detecting the change in the transmitting device. One such embodiment is illustrated in FIG. 8.

Figure 8:
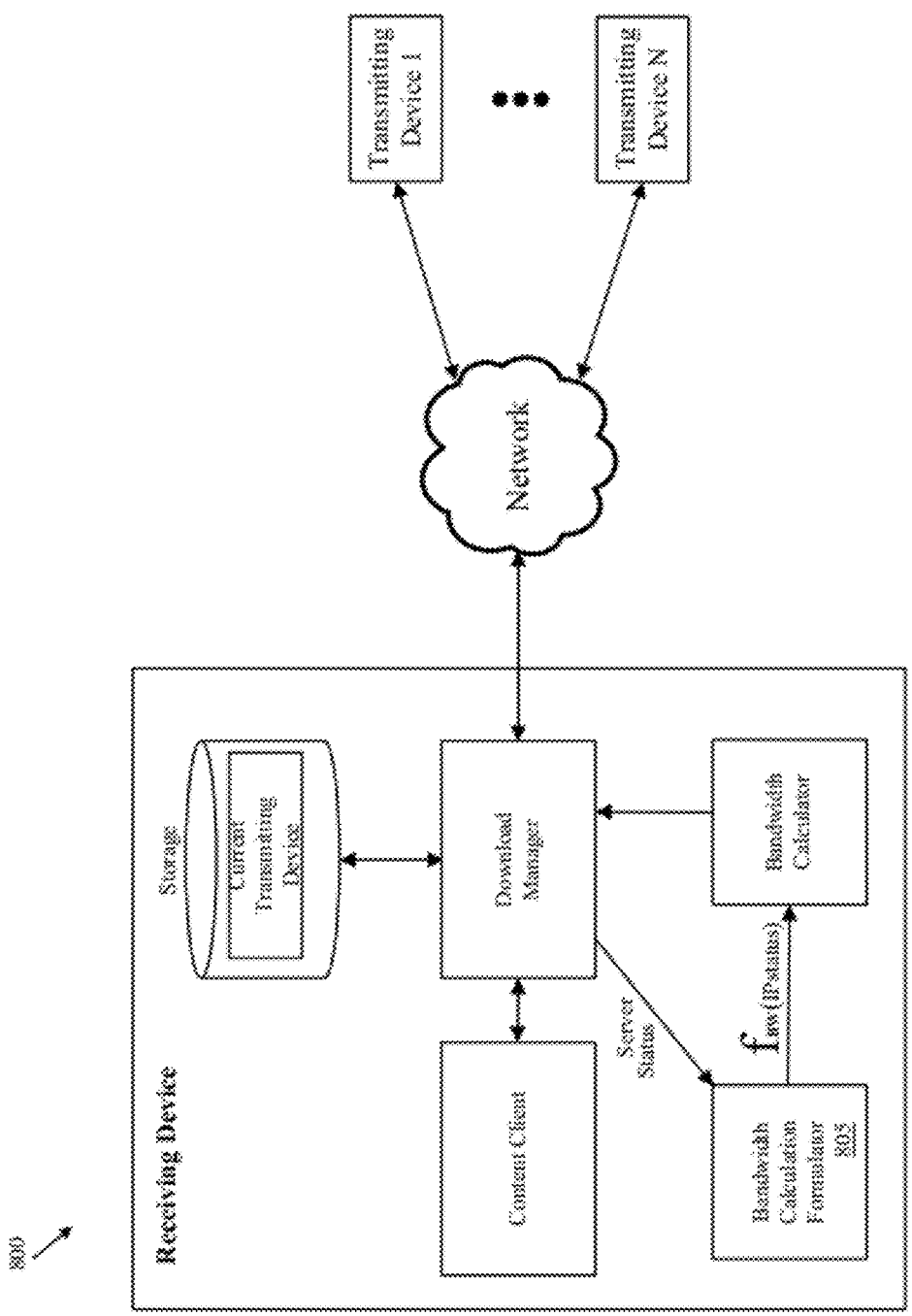
FIG. 8 illustrates an example system that generates, upon detecting the change in the transmitting device, a formula or a set of parameters for calculating bandwidth.

FIG. 8 illustrates a system 800 similar to the one shown in FIG. 1. However, this figure illustrates a system 800 that formulates a bandwidth calculation upon detecting the change in the transmitting device. As shown, the system 800 includes a bandwidth calculation formulator 805. Upon detecting the change in the transmitting device, the bandwidth calculation formulator 805, in some embodiments, specifies a new bandwidth algorithm and/or provides a set of parameters for the bandwidth calculator to estimate the bandwidth. For example, in the example illustrated FIG. 8, the bandwidth calculation formulator 805 is notified of the change in the transmitting device. The bandwidth calculation then sends a parameter (e.g., IP status) to the bandwidth calculator. Having receiving the parameter, the bandwidth calculator then selects a particular algorithm or uses a set of estimation parameters to compute the estimated bandwidth.

IV. Sample Instantaneous Bandwidth Measurements

Figure 9:
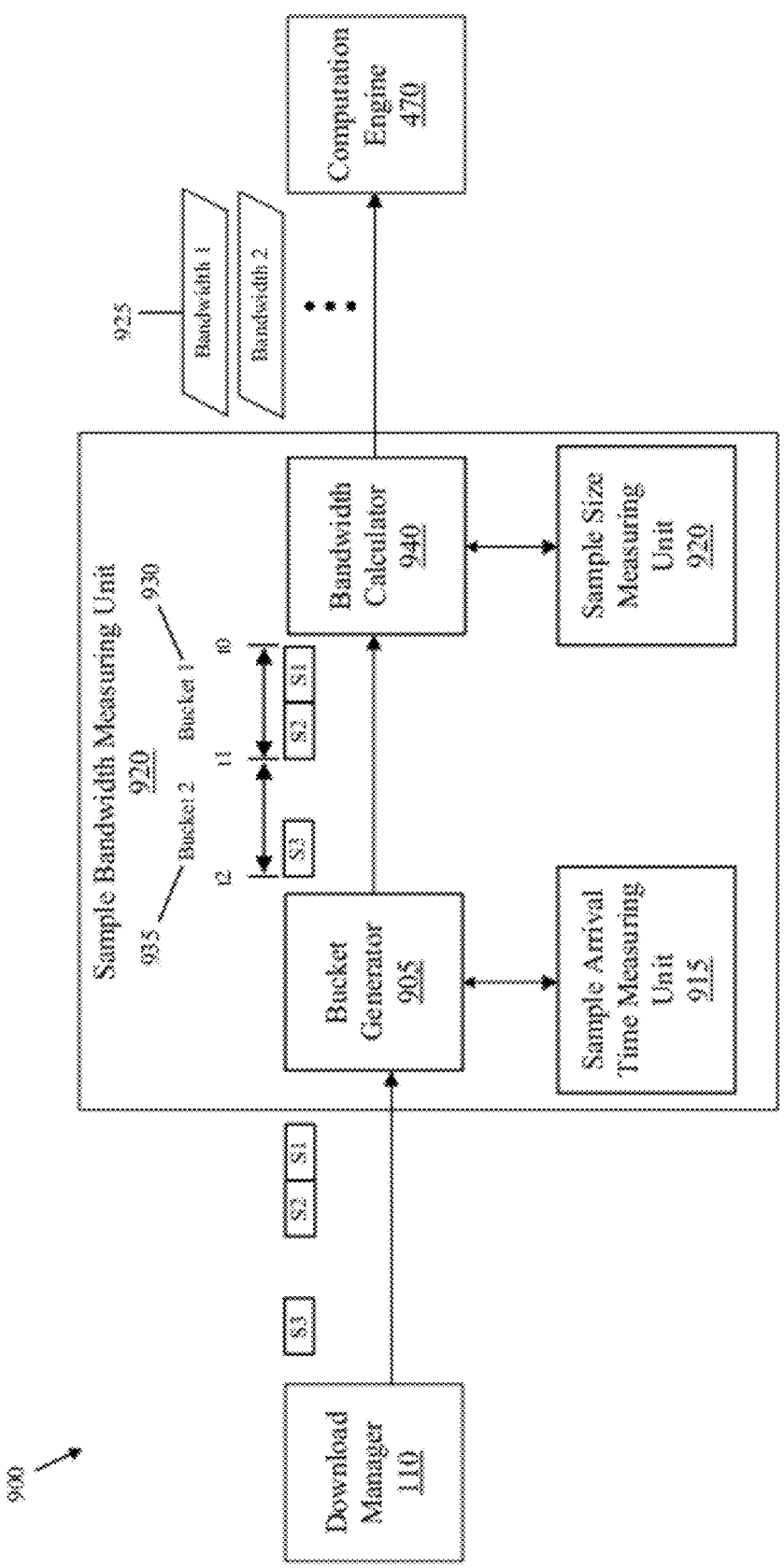
FIG. 9 conceptually illustrates computing several instantaneous bandwidth measurements based on sample data blocks.

In some embodiments, the receiving device computes a pool of sample instantaneous bandwidth measurements in order to estimate the bandwidth. FIG. 9 conceptually illustrates computing several instantaneous bandwidth measurements based on sample data blocks. Specifically, this figure illustrates the manner in which some embodiments coalesce sample data blocks into data buckets at a particular time interval to smooth out bandwidth fluctuations caused by lower level buffering mechanism. In some embodiments, each data bucket is a data unit that includes all sample data blocks within one particular time interval. In other embodiments, each data bucket is defined by a particular amount of sample data blocks that has been downloaded. In other words, the instantaneous bandwidth measurement is calculated once the particular amount has been accumulated.

As shown, the figure includes the download manger 110, the computation engine 470, and sample bandwidth measuring unit 925. The download manager 110 and the computation 470 are same as the ones described above by reference to FIG. 4.

The sample bandwidth measuring unit 920 receives several sample data blocks, e.g., s1-s3, from the download manager 110. The sample bandwidth measuring unit then computes several instantaneous bandwidth measurements 925 and sends them to the computation engine 470 for further processing. As shown in FIG. 9, the sample bandwidth measuring unit 920 of some embodiments includes a bucket generator 905, an instantaneous bandwidth calculator 940, a sample arrival time measuring unit 915, and a sample size measuring unit 920. In some embodiments, the sample bandwidth measuring unit 925 is a part of the bandwidth calculator 115 described above by reference to FIG. 4.

In some embodiments, the download manager 110 sends several sample incoming data blocks to the sample bandwidth measuring unit 920. Because of the way low level buffering mechanism (e.g., performed by a network interface card which sends the sample data blocks to the download manger 110) handles incoming data, these data blocks come to the sample bandwidth measuring unit 920 as huge blocks of data during some time periods while there is very little data coming in at other time periods, not necessarily reflective of how fast the data actually arrives or how fluctuating the network connection actually is.

In order to compensate for this bursting effect caused by the low level buffering mechanism, the bucket generator 905 receives those incoming data blocks, e.g., s1-s3, and coalesces them into data buckets (e.g., bucket 1 and bucket 2) at a particular time interval. The bucket 1 (930) contains all the data received between times t0 and t1. The bucket 2 (935) contains all the data received between times t1 and t2. The time interval between t0 and t1 is the same as the time interval between t1 and t2. In some embodiments, the bucket generator 905 uses the sample arrival time measuring unit 915 to measure the arrival time of each incoming data blocks in order to coalesces them into data buckets of predefined time intervals.

The computation engine 470 receives data buckets, e.g., bucket 1 (930) and bucket 2 (935) from the bucket generator 905. In some embodiments, the computation engine uses the sample size measuring unit 920 to measure the amount of data in each bucket to be able to calculate an instantaneous bandwidth for each bucket of data. The computed instantaneous bandwidth measurements 925 will then be sent to the computation engine 470 for further processing.

Figure 10:
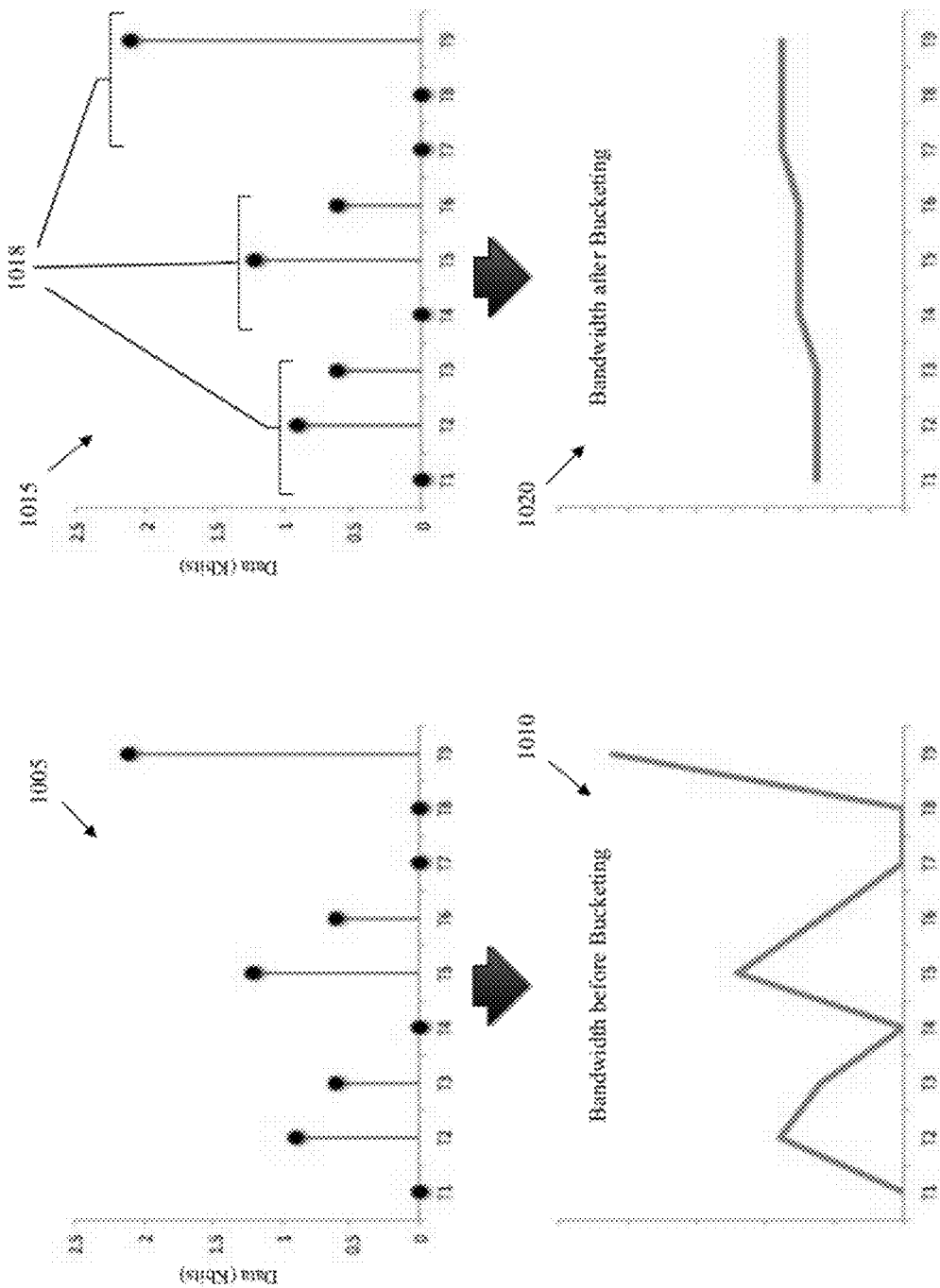
FIGS. 10A-10B illustrate an example effect of data bucketing on calculating instantaneous bandwidth measurements.

FIGS. 10A-B illustrate an example effect of data bucketing on calculating instantaneous bandwidth measurements. Specifically, FIG. 10A shows the instantaneous bandwidth measurements before bucketing and FIG. 10B shows the instantaneous bandwidth measurements after bucketing.

FIG. 10A includes a scatter chart 1005 and a line graph 1010. The scatter chart 1005 shows the amount of data received at each time period from T1 to T9. As it is illustrated in this example, at some time periods (e.g., T5 and T9), a relatively large amount of data was received. However, at some other time periods (e.g., T1, T4, T7, and T8), no data was received. If instantaneous bandwidth measurements are calculated based on these raw data blocks at each time period, as shown in the line graph 1010, the instantaneous bandwidth measurements fluctuate wildly. As described above in FIG. 9, these bandwidth fluctuations are caused by low level buffering mechanism of the receiving device and may not truly reflect bandwidth variation of the underlying network connection. In order to overcome the bandwidth fluctuations caused by low level buffering mechanism, the receiving device needs to do data bucketing to smooth out those fluctuations, which is described in FIG. 10B.

FIG. 10B includes a scatter chart 1015 and a line graph 1020. The scatter chart 1015 is similar to the scatter chart 1005 in FIG. 10A. The chart shows the amount of data received at each time period from T1 to T9. However, in the scatter chart 1015, the nine time periods from T1 to T9 are divided into three buckets 1018, each of which contains three time periods. In other words, a bucket is generated at an interval of three time periods. All data in each bucket is aggregated together in calculating bandwidth for the bucket. For example, data received during T1-T3 is added together, and then divided by the time period T1-T3, to get an instantaneous bandwidth for T1, T2, and T3.

As shown in the line graph 1020, the resulting instantaneous bandwidth measurements are quite smooth. The bursting effect caused by low level buffering mechanism has been compensated. These instantaneous bandwidth measurements are more reflective of the bandwidth fluctuation of the underlying network connection.

FIG. 9 and FIGS. 10A-B provide an example of calculating a pool of sample instantaneous bandwidth measurements. However, irrespective of the example provided above, one of ordinary skill in the art will realize that some embodiments of the invention might use other methods to calculate the pool of sample instantaneous bandwidth measurements. For instance, instead of calculating sample instantaneous bandwidth measurements at a particular time interval, the method might calculate a sample instantaneous bandwidth measurement for every set of packets received at the receiving device.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
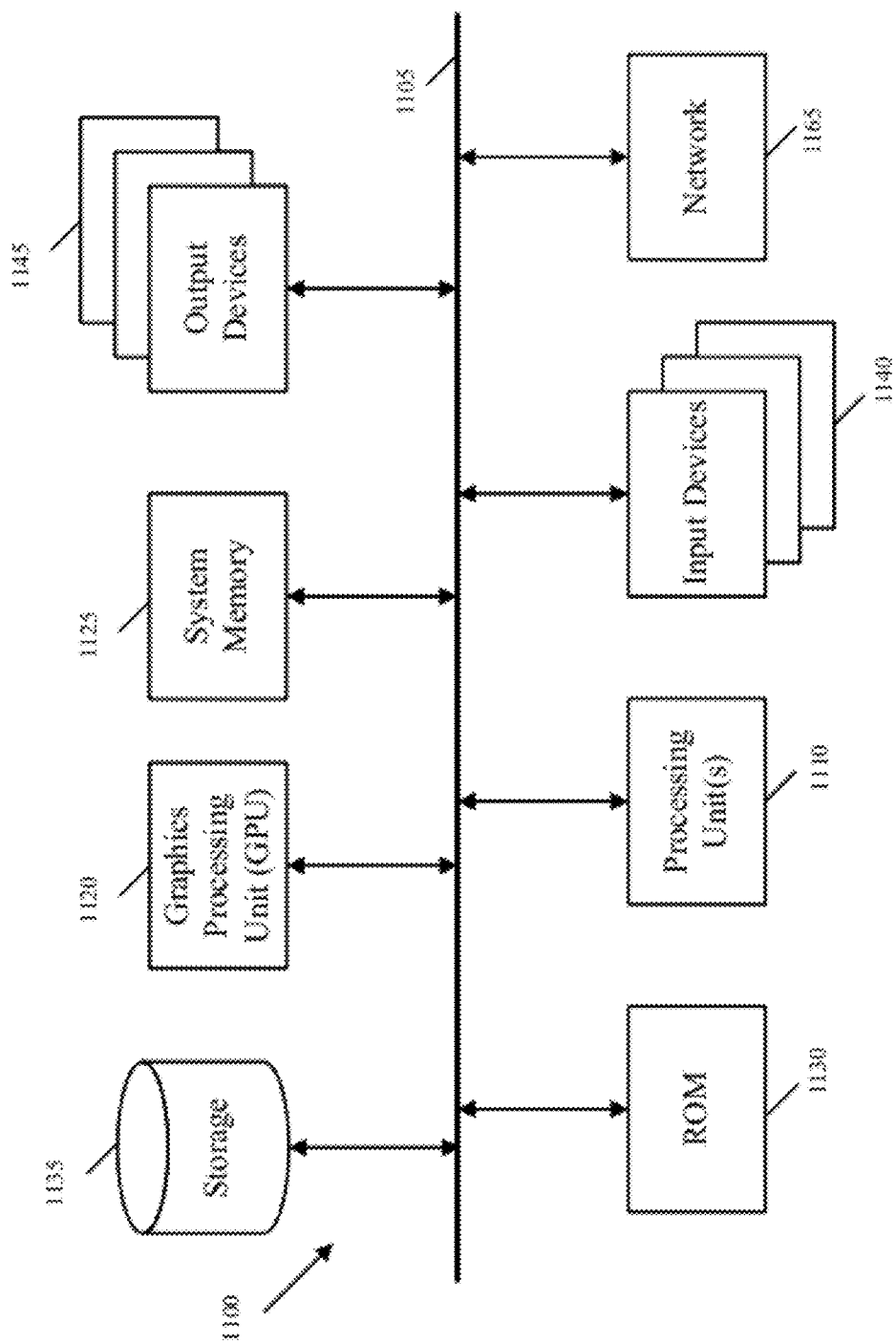
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), phone (e.g., smart phone), PDA, or any other sort of electronic device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, or ZIP® disk, and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"). The output devices 1145 display images generated by the electronic system. The output devices 1145 include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for estimating bandwidth for receiving content at a receiving device from a set of content transmitting devices, the method comprising:

computing, by the receiving device, a first estimated bandwidth for data received from a first transmitting device that is an initial content transmitting device that starts transmission of content to the receiving device at a start of the communication session, wherein said computing the first estimated bandwidth comprises using a first bandwidth computation process;

identifying, by the receiving device, that a transmitter of content to the receiving device has changed from the first transmitting device to a second transmitting device during a communication session, wherein the identifying comprises noting a change in network address for packets received during the communication session; and computing, in response to said identifying, a second estimated bandwidth by accounting for the change between the transmitting devices, wherein said computing the second estimated bandwidth comprises using a second, different bandwidth computation process.

2. The method of claim 1, wherein the first transmitting device comprises a first identity, wherein the second transmitting device comprises a second identity, wherein said identifying comprises comparing the first and second identities to determine whether the transmitter of content has changed from the first transmitting device to the second transmitting device.

3. The method of claim 2, wherein the first and second identities are network addresses.

4. The method of claim 3, wherein the network addresses are Internet Protocol (IP) addresses.

5. The method of claim 1, wherein accounting for the change comprises modifying a number of past estimated bandwidth calculations that are used for computing a new estimated bandwidth calculation.

6. The method of claim 5, wherein the past bandwidth estimations are past bandwidth estimations calculated during the communication session.

7. The method of claim 1, wherein accounting for the change comprises accounting for past bandwidth estimations for the second transmitting device.

8. A non-transitory machine readable medium storing a program for estimating bandwidth for receiving content at a receiving device from a set of content transmitting devices, the program comprising sets of instructions to cause a processor to:

identify an identity of a first transmitting device that, at a start of a communication session, starts transmission of content to the receiving device;

compute an initial estimate of the bandwidth according to a first bandwidth computation process;

identify that the transmitter of the content changes from the first transmitting device to a second transmitting device, wherein the identifying comprises noting a change in network address for packets received during the communication session; and compute a new estimated bandwidth by accounting for the identified change from the first transmitting device to the second transmitting device, wherein said computing a new estimated bandwidth comprises changing from the first bandwidth computation process to a second, different bandwidth computation process.

9. The non-transitory machine readable medium of claim 8, wherein the network address is an Internet Protocol (IP) address.

10. The non-transitory machine readable medium of claim 8, wherein the set of instructions to cause the processor to compute a new estimated bandwidth by accounting for the identified change comprises a set of instructions to cause the processor to modify a number of past estimated bandwidth calculations that are used for computing a new estimated bandwidth calculation.

11. The non-transitory machine readable medium of claim 8, wherein the set of instructions to cause the processor to compute a new estimated bandwidth by accounting for the identified change comprises a set of instructions to cause the processor to account for past bandwidth estimations for the second transmitting device.

12. The non-transitory machine readable medium of claim 11, wherein the past bandwidth estimations are past bandwidth estimations calculated during the communication session.

13. An apparatus for estimating bandwidth for receiving content at a receiving device from a set of content transmitting devices, the apparatus comprising:

a storage to store an identity of each transmitting device that at any time during a communication session is a current transmitting device that is transmitting content to the receiving device at that time, including an initial transmitting device that starts transmission of content to the receiving device at a start of the communication session; and a processor configured to:

detect that the current transmitting device has changed from a first transmitting device to a second transmitting device, wherein the detecting comprises noting a change in network address for packets received during the communication session; and compute an estimated bandwidth by accounting for any change in the current transmitting device, wherein said computing comprises changing from a first bandwidth computation process to a second, different bandwidth computation process in response to said detecting that the current transmitting device has changed.

14. The apparatus of claim 13, wherein said computing an estimated bandwidth comprises computing an initial bandwidth estimate.

15. The apparatus of claim 13, wherein said detecting the change comprises noting a change in network address for packets received from the content transmitting device.

16. The apparatus of claim 15, wherein the network address is an Internet Protocol (IP) address.

17. The apparatus of claim 13, wherein the processor is configured to account for the change by modifying a number of past estimated bandwidth calculations that are used for computing a new estimated bandwidth calculation.

18. The apparatus of claim 13, wherein the processor is configured to account for the change by accounting for past bandwidth estimations for the second transmitting device.

19. The apparatus of claim 18, wherein the past bandwidth estimations are past bandwidth estimations calculated during the communication session.

* * * * *